(12) United States Patent
Arakawa et al.

(10) Patent No.: US 6,965,001 B2
(45) Date of Patent: Nov. 15, 2005

(54) ORGANIC-INORGANIC HYBRID POLYMER MATERIALS WITH COMPOSITIONAL GRADIENT, AND PROCESSES FOR PREPARING THE SAME

(75) Inventors: Motoomi Arakawa, Osaka (JP); Kazuaki Sukata, Yawata (JP); Yasuyuki Agari, Osaka (JP); Masayuki Shimada, Sakai (JP)

(73) Assignees: Orient Chemical Industries, Ltd., Osaka-fu (JP); Osaka Municipal Government, Osaka-fu (JP)

( * ) Notice: Subject to any disclaimer, the term of this patent is extended or adjusted under 35 U.S.C. 154(b) by 625 days.

(21) Appl. No.: 10/014,512

(22) Filed: Dec. 14, 2001

(65) Prior Publication Data

US 2002/0122891 A1 Sep. 5, 2002

Related U.S. Application Data

(62) Division of application No. 09/354,152, filed on Jul. 16, 1999, now Pat. No. 6,395,341.

(30) Foreign Application Priority Data

Jul. 17, 1998 (JP) ............................................. 10-203096

(51) Int. Cl.⁷ ........................ C08F 283/00; C08G 77/00
(52) U.S. Cl. ....................... 525/474; 525/100; 528/312; 528/318; 528/317; 528/315
(58) Field of Search ................................ 525/474, 100; 528/312, 318, 317, 315

(56) References Cited

U.S. PATENT DOCUMENTS 5,804,681 A    9/1998  Breant

FOREIGN PATENT DOCUMENTS

| EP | 0686658 A1 | | 12/1995 |
|---|---|---|---|
| JP | 6270036 | | 3/1987 |
| JP | 8283425 | | 10/1996 |
| JP | 08-283425 A | * | 10/1996 |
| JP | 09087526 A | | 3/1997 |
| JP | 09-087526 A | * | 3/1997 |
| WO | WO9304094 | | 3/1993 |

OTHER PUBLICATIONS

Chemical Abstracts, vol. 126, No. 5, Feb. 3, 1997 Abstract No. 61313; (JP 8–283425 A).

Chemical Abstracts, vol. 127, No. 2, Jul. 14, 1997 Abstract No. 18488; (JP 9–087526 A).

Chemical Abstracts, vol. 107, No. 6, Aug. 10, 1987 Abstract No. 41359.

\* cited by examiner

*Primary Examiner*—Ling-Sui Choi
(74) *Attorney, Agent, or Firm*—Birch, Stewart, Kolasch & Birch, LLP

(57) ABSTRACT

According to the present invention, organic-inorganic hybrid polymer materials with compositional gradient, and processes for preparing the same are provided. In the organic-inorganic hybrid polymer materials with compositional gradient, formation of cracks, removal of surface, or deformation such as warp and distortion, under heat shock or upon aging, hardly occurs. The organic-inorganic hybrid polymer materials with compositional gradient are comprised of an organic polymer component and a metal oxide component which are covalently bonded each other, characterized in that concentration of the organic polymer component, or of the metal oxide component is increased or decreased in the direction of thickness of the material.

11 Claims, 2 Drawing Sheets

ORGANIC-INORGANIC HYBRID POLYMER MATERIALS WITH COMPOSITIONAL GRADIENT, AND PROCESSES FOR PREPARING THE SAME

This is a division of application Ser. No. 09/354,152, filed Jul. 16, 1999, now U.S. Pat. No. 6,395,341.

FIELD OF THE INVENTION

The present invention relates to a polymeric material which is useful for various kinds of plastic materials, adhesives, and coating materials.

BACKGROUND OF THE INVENTION

Various inorganic materials are now widely employed for industrial use in consideration of both property of the material and requirement of the use. A silicic ceramic material, for example silicon carbide, or silicon nitride, is excellent in mechanical strength, chemical resistance, and thermal stability. A silicic material such as silicon oxide, and titanium oxide additionally has excellent optical properties.

Since the inorganic material is hard and brittle, it is generally difficult to mold and to process the inorganic material. The inorganic material is also poor in adhesiveness with an organic material, and therefore the use is generally restricted.

On the other hand, the organic polymer is flexible and is easily processed. However, their hardness and thermal stability are largely inferior to those of the inorganic material.

Therefore, there is great demand for the material which is able to complement to each other in their properties, and is able to make the use of the respective advantages thereof.

For solving the problem, a reinforcing filler such as glass fibers, glass beads, silica, alumina, and calcium carbonate is usually included or dispersed in an organic polymer material. Such an organic-inorganic composite material has been investigated in order to add excellent properties of an inorganic material such as hardness, strength, heat resistance, and weather resistance to an organic polymer material. However, an inorganic material is generally immiscible with an organic polymer material, and it is not easy to control a dispersion state of the inorganic material microscopically.

When an inorganic material is included in an organic polymer material, a large quantity of the inorganic material have to be dispersed finely and homogeneously in an organic polymer material in order to modify the organic material effectively. Whereas, if the particle size of an inorganic material becomes small, the inorganic material becomes easy to agglomerate in an organic polymer material. Therefore it is difficult to disperse fine particles of inorganic material into an organic polymer material at random with aggregation.

Furthermore, there is a maximum limit of an addition amount of the inorganic material. Thus, if the addition amount is increased beyond the maximum limit, molding property of the resulting composite material becomes poor, fracture or cracks may easily occur in the resulting composite material.

As described above, the method of blending or combining an inorganic material with an organic polymer, is not sufficient, and it is desired to provide a novel means for providing a high-performance organic-inorganic composite material.

As a means for solving the problem, organic-inorganic hybrid polymer materials are studied. The organic-inorganic hybrid polymer material is the polymer material in which an inorganic element such as Si, Ti, and Zr is incorporated in a backbone frame of an organic material. The material is generally prepared by using sol-gel reaction with a metal alkoxide compound. The inorganic element is covalently bonded to the backbone frame of the organic material, and a dispersed state of the inorganic element becomes molecularscopically homogeneous throughout the material.

Japanese Patent Kokai Publication No. 43679/1993, 86188/1993, 104710/1996, 104711/1996, Macromolecules, vol. 25, page 4309, 1992, J. Inorg. Organomet. Polym., vol. 5, page 4, 1995, J. Appl. Polym. Sci. vol. 58, page 1263, 1995, and the like disclose an organic-inorganic hybrid polymer material in which a vinyl polymer or a hydrophilic polymer is employed as an organic polymer material.

On the other hand, functionally graded materials have recently been investigated in the art. The functionally graded materials is the high-performance material in which a compositional ratio or component distribution is gradiently altered throughout the material. The functionally graded materials is expected to be applied in the art of aircraft, aerospace, nuclear fusion, electronics, medical, and the like. Although functionally graded materials have heretofore been mainly investigated by using metal materials or ceramics, functionally graded materials by using organic polymers are also recently reported.

For example, Japanese Patent Kokai Publication No. 138780/1993 describes a plastic molded product of which heat resistance is gradiently distributed, prepared by radically curing plural layers, each of the layers being composed of radically polymerizable vinyl polymers having different viscosities.

Japanese Patent Kokai Publication No. 57009/1994 describes a polyolefin of which crosslinking degree is gradient, prepared by mixing, fusing and molding with changing the ratio of an alkenyl silane/olefine copolymer component to a catalyst component. Japanese Patent Kokai Publication No. 176325/1997 describes a material in which a silicon or oxygen content is gradient, prepared by heat treating a polymer having a Si—H bond and alkyne.

Japanese Patent Kokai Publication No. 283425/1996 describes an example for applying the technique of the functionally graded materials to an organic-inorganic composite material. There is described in the publication, a polymer material with compositional gradient in which metal oxide particles are dispersed in an organic polymer. The component-gradient polymer material is prepared by the process comprising: applying a homogeneous solution of a heat curable resin composition and silicone alkoxide onto a substrate; hydrolyzing and polycondensing the silicone alkoxide under a specific condition; and curing the heat curable resin. However, the metal oxide particles and the organic polymer are not covalently bonded in the polymer material, and the polymer material with compositional gradient disclosed herein is classified into a dispersed type organic-inorganic composite material.

Further, a metal oxide content of the polymer material with compositional gradient is up to about 60%. Such a level of the metal oxide content is insufficient as functionally graded materials. On the other hand, such an amount is thought to be about a maximum limit for dispersing an inorganic material into an organic polymer material. Therefore, it is difficult to further increase an amount of metal oxide particles dispersed in the component-gradient polymer material.

The technical effects of the functionally graded materials are generally heat shock resistance, warpage resistance, and the like. However, Japanese Patent Kokai Publication No. 283425/1996 does not refer to such a properties.

SUMMARY OF THE INVENTION

According to the present invention, organic-inorganic hybrid polymer materials with compositional gradient, and processes for preparing the same are provided. In the organic-inorganic hybrid polymer materials with compositional gradient, formation of cracks, removal of surface, or deformation such as warp and distortion, under heat shock or upon aging, hardly occurs.

The present invention provides organic-inorganic hybrid polymer materials with compositional gradient composed of an organic polymer component and a metal oxide component which are covalently bonded each other, characterized in that concentration of the organic polymer component, or of the metal oxide component is increased or decreased in the direction of thickness of the material.

The organic-inorganic hybrid polymer materials with compositional gradient may generally be prepared by the process comprising the steps of:

providing a substrate having a surface; and applying plural layers of solutions or wet gels which comprises at least one of an organic polymer and a metal alkoxide, on the surface of the substrate, so that concentration of the organic polymer component, or of the metal oxide component in the resulting material, is increased or decreased in the direction of thickness of the material.

Preferably, the organic-inorganic hybrid polymer materials with compositional gradient may be prepared by the process comprising the steps of:

(i) providing a substrate having a surface;

(ii) applying thereon a solution or a wet gel which comprises at least one of an organic polymer and a metal alkoxide at a certain compositional ratio;

(iii) applying thereon a solution or a wet gel which comprises at least an organic polymer or a metal alkoxide in altering a compositional ratio of the solution or the wet gel so that concentration of the organic polymer component, or of the metal oxide component in the resulting material, is increased or decreased in the direction of thickness of the material.

Figure 1:
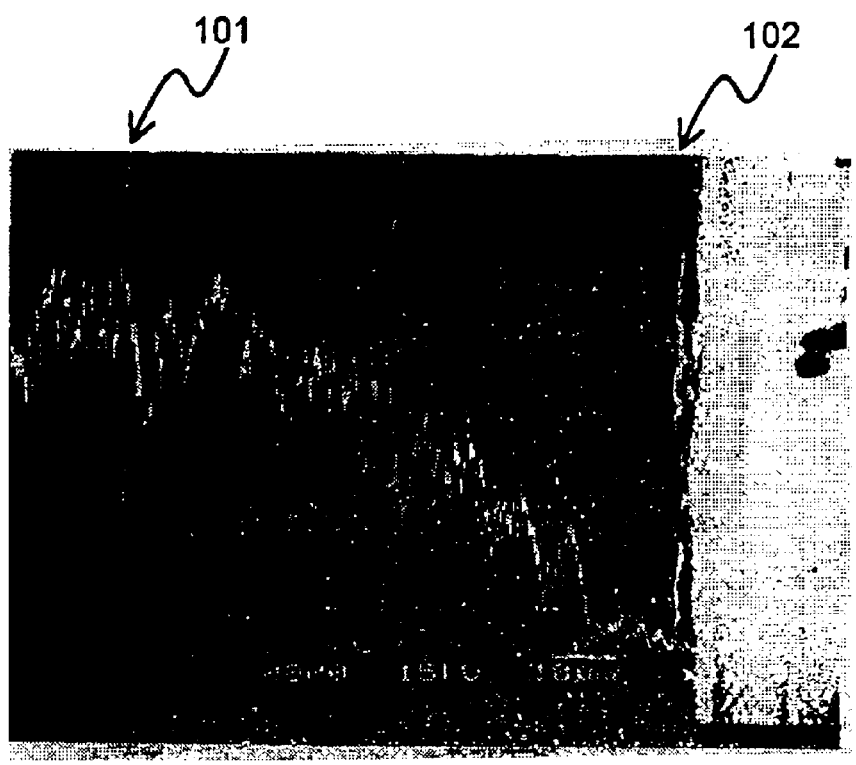
FIG. 1 is a SEM photograph which shows cross-section of silica-polycarbonate component-gradient polymer film coated on a glass substrate, with Si element concentration curve.

In the drawings, 101, 201, 301, and 401 represent a boundary part of the substrate and the film, and 102, 202, 302, and 402 show a surface part of the film.

DETAILED DESCRIPTION OF THE INVENTION

Organic Polymer (A)

Organic polymer (A) of the present invention is a polymer which has a reactive functional group with metal alkoxide compound (B). Organic polymer (A) may be those prepared by any procedure.

As a backbone frame of organic polymer (A), thermoplastic resins or thermoplastic elastomer precursors such as polyethylene, polypropylene, vinyl chloride resin, polystyrene, methyl methacrylate resin, polyamide, polyacetal, polycarbonate, polyester, polyphenylene ether, polymethyl pentene, polysulfone, polyether sulfone, polyphthalamide, polyphenylene sulfide, polyarylate, polyimide, polyether imide, and polyether ketone; and thermosetting resin precursors such as phenol resin, epoxy resin, acrylic resin, melamine resin, alkyd resin, and urea resin.

Among these, the thermoplastic resins are preferred, and engineering plastics such as polyamide, polyacetal, polycarbonate, polysulfone, and polyarylate are more preferred due to their high performance.

The backbone frame of organic polymer (A) may be one component selected from the above described polymers or precursors, or may be a copolymer thereof. Organic polymer (A) may be a mixture of the plural polymers, and it may be linear or branched. Organic polymer (A) is preferably soluble or swellable in a solvent such as halogenated hydrocarbon, ether, alcohol, and aprotic polar solvent, and preferably has a number average molecular weight of from 500 to 50000, more preferably 1000 to 15000. The number average molecular weight of organic polymer (A) may generally be measured by the GPC method.

A functional group of organic polymer (A) can react with a metal alkoxide compound (B). The specific functional group of organic polymer (A) includes, but not limited to, an alkoxymetal group, a hydroxyl group, an amino group, a carboxyl group. An alkoxymetal group is particularly preferred.

The functional group equivalent of organic polymer (A) is generally 1 to 100, preferably 1 to 50, more preferably 2 to 10. If the functional group equivalent of organic polymer (A) is less than 1, performance of the resulting material may become poor, and is more than 100, the resulting material may become fragile.

Metal Alkoxide Compound (B)

Metal alkoxide compound (B) of the present invention is not limited to, and any class of them may be used. Preferred examples of metal alkoxide compound (B) are those represented by the formula (1):

$$A_pM \qquad (1)$$

wherein A represents an alkoxy group having 1 to 8, preferably 1 to 4 carbon atoms;

M represents a metal element selected from the group composed of Si, Ti, Zr, Fe, Cu, Sn, B, Al, Ge, Ce, Ta, and W, preferably the group composed of Si, Ti, and Zr; and p represents an integer of 2 to 6.

Specific examples of metal alkoxide compound (B) include tetra-alkoxysilanes such as tetramethoxysilane, tetraethoxysilane, tetraisopropoxysilane, and tetrabutoxysilane;

titanium tetra-alkoxides such as titanium tetra-n-propoxide, titanium tetra-iso-propoxide, and titanium tetrabutoxide;

zirconium tetra-alkoxides such as zirconium tetra-n-propoxide, zirconium tetra-iso-propoxide, and zirconium tetrabutoxide; and metal alkoxides such as copper dimethoxide, barium diethoxide, boron trimethoxide, gallium triethoxide, aluminium tributoxide, germanium tetraethoxide, lead tetrabutoxide, tantalum penta-n-propoxide, and tungsten hexaethoxide.

The other examples of metal alkoxide compound (B) are those represented by the formula (2):

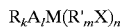

wherein R represents a hydrogen atom, an alkyl group having 1 to 12, preferably 1 to 5 carbon atoms, or a phenyl group, A represents an alkoxy group having 1 to 8, preferably 1 to 4 carbon atoms, M represents a metal element selected from the group composed of Si, Ti, Zr, Fe, Cu, Sn, B, Al, Ge, Ce, Ta, and W, preferably the group composed of Si, Ti, and Zr, R' represents an alkylene group or an alkylidene group having 1 to 4, preferably 2 to 4 carbon atoms, X represents a functional group selected from the group composed of an isocyanato group, an epoxy group, a carboxyl group, an acid halide group, an acid anhydride group, an amino group, a thiol group, a vinyl group, a methacryl group, and a halogen atom, and k represents an integer of 0 to 5, l represents an integer of 1 to 5, m represents 0 or 1, n represents an integer of 0 to 5.

Specific examples of metal alkoxide compound (B) of which metal is silicone, include (alkyl)alkoxysilanes such as trimethoxysilane, triethoxysilane, tri-n-propoxysilane, dimethoxysilane, diethoxysilane, di-iso-propoxysilane, monomethoxysilane, monoethoxysilane, monobutoxysilane, methyldimethoxysilane, ethyldiethoxysilane, dimethylmethoxysilane, di-iso-propylisopropoxysilane, methyltrimethoxysilane, ethyltriethoxysilane, n-propyltri-n-propoxysilane, butyltributoxysilane, dimethyldimethoxysilane, diethyldiethoxysilane, di-iso-propyldi-iso-propoxysilane, dibutyldibutoxysilane, trimethylmethoxysilane, triethylethoxysilane, tri-n-propyl-n-propoxysilane, tributylbutoxysilane, phenyltrimethoxysilane, diphenyldiethoxysilane, and triphenylmethoxysilane;

(alkyl)alkoxysilanes having an isocyanato group such as 3-isocyanatopropyltrimethoxysilane, 3-isocyanatopropyltriethoxysilane, 2-isocyanato-ethyltriethoxysilane, 2-isocyanato-ethyltri-n-propoxysilane, 2-isocyanato-ethylethyldibutoxysilane, 3-isocyanatopropylmethyldimethoxysilane, 3-isocyanatopropylethyldiethoxysilane, 3-isocyanatopropyldimethyl-iso-propoxysilane, 3-isocyanatopropyldiethylethoxysilane, 2-isocyanatoethyldiethylbutoxysilane, di(3-isocyanatopropyl)diethoxysilane, di(3-isocyanatopropyl)methylethoxysilane, and ethoxytriisocyanatosilane;

(alkyl)alkoxysilanes having an epoxy group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-glycidoxypropyldimethylethoxysilane, 2-(3,4-epoxycyclohexyl)ethyltrimethoxysilane, and 3,4-epoxybutyltrimethoxysilane;

(alkyl)alkoxysilanes having a carboxyl group such as carboxymethyltriethoxysilane, carboxymethylethyldiethoxysilane, and carboxyethyldimethylmethoxysilane;

alkoxysilanes having an acid anhydride group such as 3-(triethoxysilyl)-2-methylpropylsuccinic anhydride;

alkoxysilanes having a acid halide group such as 2-(4-chlorosulfonylphenyl)ethyltriethoxysilane;

(alkyl)alkoxysilanes having an amino group such as 3-aminopropyltrimethoxysilane, 3-aminopropyltriethoxysilane, N-2-(aminoethyl)-3-aminopropyltriethoxysilane, N-2-(aminoethyl)-3-aminopropylmethyldimethoxysilane, and N-phenyl-3-aminopropyltrimethoxysilane;

(alkyl)alkoxysilanes having a thiol group such as 3-mercaptopropyltrimethoxysilane, 3-mercaptopropyltriethoxysilane, 2-mercaptoethyltriethoxysilane, and 3-mercaptopropylmethyldimethoxysilane;

(alkyl)alkoxysilanes having a vinyl group such as vinyltrimethoxysilane, vinyltriethoxysilane, and vinylmethyldiethoxysilane;

(alkyl)alkoxysilanes having a methacryl group such as 3-methacryloxypropyltrimethoxysilane, 3-methacryloxypropyltriethoxysilane, and 3-methacryloxypropylmethyldimethylsilane;

(alkyl)alkoxysilanes having a halogen atom such as triethoxyfluorosilane, 3-chloropropyltrimethoxysilane, 3-bromopropyltriethoxysilane, and 2-chloroethylmethyldimethoxysilane; and alkylalkoxysilanes employing an alkoxy group as a functional group such as isopropyltri-isopropoxysilane, and tri-isopropylisopropoxysilane.

Substantially the same compounds as described above except that the metal element other than silicon, for example Ti, Zr, Fe, Cu, Sn, B, Al, Ge, Ce, Ta, or W is used, are also included in the scope of metal alkoxide compound (B) of the present invention.

Specific examples of such compounds include monoisocyanatotrialkoxymetals such as 2-isocyanatoethyltripropoxyzirconium, and 2-isocyanatoethyltributoxytin;

monoisocyanatodialkoxymetals such as 3-isocyanatopropylmethyldi-isopropoxytitane, 2-isocyanatoethylethyldipropoxyzirconium, 2-isocyanatoethylmethyldibutoxytin, and isocyanatomethyldimethoxyaluminium;

monoisocyanatomonoalkoxymetals such as 3-isocyanatopropyldimethylisopropoxytitane, 2-isocyanatoethyldiethylpropoxyzirconium, 2-isocyanatoethyldimethylbutoxytin, and isocyanatomethyl-methylmethoxyaluminium;

metal alkoxides employing an epoxy group as a functional group such as 3-glycidoxypropyltriisopropoxytitane, 3-glycidoxypropylmethyldi-isopropoxytitane, 3-glycidoxypropyldimethylisopropoxytitane, 3,4-epoxybutyltripropoxyzirconium, 3,4-epoxybutylmethyldipropoxyzirconium, 3,4-epoxybutyldimethylpropoxyzirconium, and β-(3,4-epoxycyclohexyl)ethyltriethoxytin.

Metal alkoxide compound (B) may be used alone or in combination of not less than two thereof. The metal alkoxide compound which includes not less than two kinds of metal such as Mg[Al(iso-OC$_3$H$_7$)$_4$]$_2$, Ba[Zr$_2$(OC$_2$H$_5$)$_9$]$_2$, (C$_3$H$_7$O)$_2$ Zr[Al(OC$_3$H$_7$)$_4$]$_2$, or the oligomer type metal alkoxide compound which includes not less than two repeating unites in the molecule such as tetramethoxysilane oligomer, tetraethoxysilane oligomer are also employed. The alkoxy group of metal alkoxide compound (B) may be an acetoxy group.

Organic-inorganic Hybrid Polymer Materials with Compositional Gradient

Organic-inorganic hybrid polymer materials is prepared by the process of: a solution of organic polymer (A) which has a reactive functional group with metal alkoxide compound (B), and metal alkoxide compound (B) is prepared; and the solution is hydrolyzed and polycondensed on the sol-gel reaction.

In preparing the organic-inorganic hybrid polymer material, mixtures of the organic polymer (A) and the metal alkoxide compound (B), of which compositional ratio being each gradiently altered within the range of 0/10 to 10/0, are prepared; the solutions are applied to form a multilayer in order of the compositional ratio; and the layers are hydrolyzed and polycondensed on the sol-gel reaction to obtain the objective organic-inorganic hybrid polymer materials with compositional gradient.

A content of the organic polymer component or the metal alkoxide component in the organic-inorganic hybrid polymer materials with compositional gradient is preferably not more than 30% by weight at the lowest region, and not less than 70% by weight at the highest region.

Examples for application of the organic-inorganic hybrid polymer materials with compositional gradient include a materials of coating, thread, film, and molded articles having a shape of ball, block, and the like.

Organic-inorganic hybrid polymer material with compositional gradient of the present invention basically has an internal structure in which a compositional ratio of an organic polymer component and a metal alkoxide component is constant in the parallel direction with the surface of the material, and the compositional ratio is gradiently altered, in the direction of thickness of the material, in the perpendicular direction to a surface of the material, or in the direction of from the surface toward the inside of the material. Therefore, the organic-inorganic hybrid polymer materials with compositional gradient of the present invention is different from those which contain therein a discontinuously altered concentration due to random coagulation, or phase separation; or different from a coated film which has uniform concentration throughout the material.

Throughout the specification, the hydrolysis and polycondensation on the sol-gel process means the reaction process in which a polymer having an alkoxymetal group reacts with water, the alkoxymetal group converts to a hydroxyl group, and the hydroxyl group is simultaneously polycondensed with an adjacent hydroxymetal group (e.g., —Si(OH)$_3$) or an adjacent alkoxymetal group by dehydration or elimination of alcohol to form three-dimensional crosslinkage composed of inorganic covalent bond. The polycondensation reaction typically occurs due to dehydration between two hydroxymetal groups, but the dehydration may occur between a hydroxymetal group and a functional group having an active hydrogen such as the other hydroxyl group, an amino group, and a carboxyl group.

The water may be added to the reaction process in the amount sufficient for converting all of the alkoxy group to the hydroxyl group. Otherwise, water present in the reaction mixture, or moisture of an atmosphere may be utilized. The reaction is preferably conducted at from room temperature to 100° C. for 0.5 to 24 hours. An acidic catalyst such as hydrochloric acid, sulfonic acid, acetic acid, benzenesulfonic acid, and p-toluenesulfonic acid, or a basic catalyst such as sodium hydroxide, potassium hydroxide, ammonia, triethylamine, piperidine, and 1,8-diazabicyclo-[5,4,0]-7-undecene (DBU), may also be employed.

The resulting material may further be heated at 50 to 500° C., for 5 minutes to 48 hours in order to surely proceed the polycondensation reaction and to form hard crosslinkage.

The internal structure of organic-inorganic hybrid polymer materials with compositional gradient of the present invention is microscopically uniform and the compositional ratio of an organic polymer component or a metal alkoxide component is gradiently altered in the direction of thickness of the material, and the processes for preparing the material are not limited.

However, an example of the process for preparing the material is as follows. The first mixed composition including organic polymer (A) and metal alkoxide compound (B) in a certain compositional ratio is prepared. The first mixed composition is then hydrolyzed to obtain the first partially condensed wet gel. The first partially condensed wet gel is applied on a surface of a substrate to form the first layer.

The second mixed composition including organic polymer (A) and metal alkoxide compound (B), the compositional ratio of which is slightly changed from the first mixed composition, is prepared. The second mixed composition is hydrolyzed to obtain the second partially condensed wet gel. The second partially condensed wet gel is applied on a surface of the first layer. The procedures for forming the layer are then repeatedly conducted. When the layers of the compositions are formed, they are then completely hydrolyzed and polycondensed.

Organic-inorganic hybrid polymer materials with compositional gradient prepared by the process has an internal structure in which the organic polymer component or the metal alkoxide component are microscopically uniform, covalently bonded, and the compositional ratio thereof is gradiently altered, in the direction of thickness of the material, in the perpendicular direction to a surface of the material, or in the direction of from the surface toward the inside of the material. Therefore, formation of cracks, removal of surface, or deformation such as warp and distortion, under heat shock or upon aging, hardly occurs in the organic-inorganic hybrid polymer materials with compositional gradient.

Examples of the solvent employed for the sol-gel reaction include a hydrocarbon solvent such as benzene, toluene, xylene, ethyl benzene, and n-hexane; a halogenated hydrocarbon solvent such as carbon tetrachloride, chloroform, dichloromethane, chloroethane, dichloroethane, chlorobenzene, dichlorobenzene, and trichlorobenzene; an ether solvent such as tetrahydrofuran, 1,4-dioxane, 1,3-dioxane, diethyl ether, and dibutyl ether; a ketone solvent such as acetone, methyl ethyl ketone, methyl isobutyl ketone, and cyclohexanone, but is not limited to these examples. Generally, a polar solvent such as an alcoholic solvent is employed.

The metal selected from the group composed of Si, Ti, Zr, Fe, Cu, Sn, B, Al, Ge, Ce, Ta, and W, and a metal compound thereof such as metal oxide, metal complex, metal salt, and the like may further be employed in the hydrolysis and polycondensation reaction of the present invention, in view of further improving strength, hardness, weather resistance, chemical resistance, flame resistance, static resistance of the resulting material; for newly supplying the performance to the material; or for controlling the inorganic content or the crosslinking density of the material.

An anti-drying agent such as formamide, dimethylformamide, dioxane, oxalic acid, or the other additives such as acetyl acetone, and the like may be included in the reaction mixture for the hydrolysis and polycondensation reaction of the present invention for preventing from forming the clack during the drying process.

In organic-inorganic hybrid polymer materials with compositional gradient of the present invention, the properties of an inorganic material such as heat resistance, weather resistance, surface hardness, rigidity, water resistance, chemical resistance, stain resistance, mechanical strength, flame retardant, and the like, are suitably supplied to an organic polymer material. In the opposite word, the properties of an organic material such as impact resistance, softness, easy-processable, and the like, are suitably supplied to an inorganic polymer material.

In addition, formation of cracks, removal of surface, or deformation such as warp and distortion, under heat shock or upon aging, hardly occurs in the organic-inorganic hybrid polymer materials with compositional gradient, because the compositional ratio of an organic polymer component or a metal alkoxide component is gradiently altered.

Therefore, organic-inorganic hybrid polymer materials with compositional gradient of the present invention may be coated on a plastic material so that the organic polymer content is decreased and the metal alkoxide content is increased from the plastic surface toward the polymer material surface, to obtain a plastic material the surface of which is excellent in hardness, abrasive resistance, chemical resistance, pollution resistance, heat resistance and the like.

Otherwise, organic-inorganic hybrid polymer materials with compositional gradient of the present invention may be coated on a glass or a metal material so that the metal alkoxide content is decreased and the organic polymer content is increased from the glass surface toward the polymer material surface, to obtain a glass or a metal material the surface of which is excellent in impact resistance, and hard to be broken. Flying of splinters is inhibited even if the the glass or the metal materials is broken.

Technical Effects of the Invention

Organic-inorganic hybrid polymer materials with compositional gradient is provided in which an organic polymer and an metal oxide are covalently bonded, which is suitable for use in a high performance and a highly functional plastic materials, a plastic molded article or film, a sealing agent, an adhesive agent, a binder for a coating, a construction materials, an optical materials, an additive for a resin, a surface modifying agent, a hard coating agent, an electric or an electronic materials, a medical materials, or a filler, and the like.

EXAMPLES

The present invention is illustrated by the following examples which, however, are not to be construed as limiting the present invention to their details.

Preparation Example 1

70.0 g of polycarbonate diol (PC diol) having a number average molecular weight of 6600, and a hydroxyl group equivalent of 1.6 was dissolved into 500 mL of chloroform. To the solution was added 7.9 g of 3-isocyanatopropyltriethoxysilane (IPTES), heated with refluxing for 15 hours, and cooled to room temperature. The reaction mixture was dropwise added to 7 L of methanol to precipitate the reaction product. The precipitated substance was filtered off, washed with methanol, and dried in vacuo (97% yield).

$^1$H-NMR spectrum showed that the reaction product was alkoxysilylated polycarbonate in which an alkoxysilyl group is introduced at the both ends of the polycarbonate (PCS). The alkoxysilyl group equivalent of the reaction product was 1.6. The number average molecular weight of the reaction product was determined to be 7500 by GPC measurement.

The detailed conditions for determining the molecular weight are as follows.

| Apparatus | Model HLC8020 made by Tosoh Corp. |
|---|---|
| Column | KF-806LX2 and KF-803LX1 (three columns were coupled) made by Showadenko Co., Ltd. |
| Pre-column | KF-2000 made by Showadenko Co., Ltd. |
| Carrier | THF |
| Temperature | 40° C. |
| Flow rate | 1.0 ml/min. |
| Detector | Refractometer |
| Recorder | Model SC-8020 made by Tosoh Corp. |
| Conversion standard | Polystyrene |

Preparation Example 2

70.0 g of PC diol having a number average molecular weight of 3900, and a hydroxyl group equivalent of 1.8 was dissolved into 500 mL of chloroform. To the solution was added 13.3 g of IPTES, heated with refluxing for 10 hours, and cooled to room temperature. The reaction mixture was dropwise added to 7 L of methanol to precipitate the reaction product. The precipitated substance was filtered off, washed with methanol, and dried in vacuo (97% yield).

$^1$H-NMR spectrum showed that the reaction product was alkoxysilylated polycarbonate in which an alkoxysilyl group is introduced at the both ends of the polycarbonate (PCS). The alkoxysilyl group equivalent of the reaction product was 1.8. The number average molecular weight of the reaction product was determined to be 4400 by GPC measurement.

Preparation Example 3

17.5 g of polyphenylene ether diol having a number average molecular weight of 3500, and a hydroxyl group equivalent of 2.0 was dissolved into 200 mL of chloroform. To the solution was added 4.8 g of IPTES, heated with refluxing for 10 hours, and cooled to room temperature. The reaction mixture was dropwise added to 2 L of methanol to precipitate the reaction product. The precipitated substance was filtered off, washed with methanol, and dried in vacuo (95% yield).

$^1$H-NMR spectrum showed that the reaction product was alkoxysilylated polyphenylene ether in which an alkoxysilyl group is introduced at the both ends of the polyphenylene ether (PPS). The alkoxysilyl group equivalent of the reaction product was 2.0. The number average molecular weight of the reaction product was determined to be 4300 by GPC measurement.

Preparation Example 4

26.0 g of polysulfone diol having a number average molecular weight of 5200, and a hydroxyl group equivalent 20 of 1.7 was dissolved into 300 mL of chloroform. To the solution was added 3.5 g of IPTES, heated with refluxing for 11 hours, and cooled to room temperature. The reaction mixture was dropwise added to 3 L of methanol to precipitate the reaction product. The precipitated substance was filtered off, washed with methanol, and dried in vacuo (96% yield).

$^1$H-NMR spectrum showed that the reaction product was alkoxysilylated polysulfone in which an alkoxysilyl group is introduced at the both ends of the polysulfone (PSS). The alkoxysilyl group equivalent of the reaction product was 1.7. The number average molecular weight of the reaction product was determined to be 6000 by GPC measurement.

Preparation Example 5

30.5 g of polyarylate diol having a number average molecular weight of 6100, and a hydroxyl group equivalent of 1.6 was dissolved into 300 mL of chloroform. To the solution was added 3.2 g of IPTES, heated with refluxing for 15 hours, and cooled to room temperature. The reaction mixture was dropwise added to 3 L of methanol to precipitate the reaction product. The precipitated substance was filtered off, washed with methanol, and dried in vacuo (96% yield).

$^1$H-NMR spectrum showed that the reaction product was alkoxysilylated polyarylate in which an alkoxysilyl group is introduced at the both ends of the polyarylate (PAS). The alkoxysilyl group equivalent of the reaction product was 1.6. The number average molecular weight of the reaction product was determined to be 6700 by GPC measurement.

Preparation Example 6

14.0 g of 1,4-hydrogenated polybutadiene diol having a number average molecular weight of 2800, and a hydroxyl group equivalent of 2.3 was dissolved into 150 mL of chloroform. To the solution was added 4.3 g of IPTES, heated with refluxing for 8 hours, and cooled to room temperature. An organic solvent and a low molecular weight compound were distilled out by using an evaporator (99% yield).

$^1$H-NMR spectrum showed that the reaction product was alkoxysilylated hydrogenated polybutadiene in which an alkoxysilyl group is introduced at the both ends of the hydrogenated polybutadiene (HPBS). The alkoxysilyl group equivalent of the reaction product was 2.1. The number average molecular weight of the reaction product was determined to be 3500 by GPC measurement.

Preparation Example 7

14.5 g of polyester diol having a number average molecular of 2900, and a hydroxyl group equivalent of 2.0 was dissolved into 150 mL of chloroform. To the solution was added 4.0 g of IPTES, heated with refluxing for 24 hours, and cooled to room temperature. An organic solvent and a low molecular weight compound were distilled out by using an evaporator (99% yield).

$^1$H-NMR spectrum showed that the reaction product was alkoxysilylated polyester in which an alkoxysilyl group is introduced at the both ends of the polyester (PES). The alkoxysilyl group equivalent of the reaction product was 1.9. The number average molecular weight of the reaction product was determined to be 3400 by GPC measurement.

Example 1

A mixed composition containing the PCS having a number average molecular weight of 7500 prepared in Preparation Example 1 and tetraethoxysilane (TEOS) in the ratio by weight shown in Table 1 was hydrolyzed in tetrahydrofuran (THF) by using 1N aqueous hydrochloride at room temperature to obtain solutions No. 1 to 5.

TABLE 1

Amounts of Components Employed for Preparing Wet Gel

| No. | PCS/TEOS (ratio) | PCS (g) | TEOS (g) | THF (ml) | 1N-HCl (mg) |
|---|---|---|---|---|---|
| 1 | 0/100 | 0 | 2.0 | 10 | 700 |
| 2 | 25/75 | 0.5 | 1.5 | 13 | 530 |
| 3 | 50/50 | 1.0 | 1.0 | 15 | 370 |
| 4 | 75/25 | 1.5 | 0.5 | 18 | 200 |
| 5 | 100/0 | 2.0 | 0 | 20 | 30 |

The solutions of Table 1 were coated on a glass substrate by using a spin coater in the order of No. 1 to 5, and a 10% dichloromethane solution of a polycarbonate resin having a number average molecular weight of 36000, commercially available from Mitsubishi Engineering Plastics K.K. as the trade name of "IUPILON", was then spin coated thereon in the same manner.

When one solution was coated, the coated layer was allowed to stand at room temperature for 1 minute, and the next solution was coated, in conducting the coating steps. The transparent coated glass substrate was then allowed to stand at room temperature for 1 day, and heat treated at 100° C. for 10 hours to obtain a silica/polycarbonate component-gradient film (80 μm in film thickness).

Infrared analysis was conducted on a surface of the resulting silica/polycarbonate component-gradient film. Peaks which belong to a PC component such as a large peak of a carbonate group at about 1770 cm$^{-1}$ are indicated, but there are no peaks which belong to a silica component.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a glass surface through a film surface, and Si element was not detected on the film surface.

FIG. 1 is a SEM photograph which shows cross-section of silica-polycarbonate component-gradient film coated on a glass substrate, with Si element concentration curve. In the drawing, 101 shows a boundary part of the glass substrate and the film, and 102 shows a surface part of the film.

The Si element concentration curve of FIG. 1 indicates that a silica component is present in quantity near by the glass surface and a polycarbonate (PC) component is not present, whereas, a silica component is not present near by the film surface and is almost a PC component. It is expected that the PC component also forms a component-gradient structure, because the silica component forms a component-gradient structure.

The results of the IR analysis indicate that Si element is not present in the region near by the film surface, the results of Si elemental analysis by using SEM indicate that intensity of Si element near by the glass surface is equal to that of glass. Therefore, a compositional ratio of the silica component to the PC component is gradient in the range of from 10/0 to 0/10, throughout the film.

IR analysis was conducted according to the ATR method by using the model IMPACT 400M commercially available from Nicore Japan K.K. SEM observation was conducted by using the model JNM-EX270 commercially available from JEOL.

The results of heat shock test of this film were shown in Table 8.

Example 2

A transparent silica/polycarbonate component-gradient film was prepared according to substantially the same manner as described in Example 1, except that when one solution was coated, the coated layer was heat treated at 150° C. for 30 minutes and allowed to cool, and the next solution was coated (50 μm in film thickness).

Infrared analysis and SEM observation were conducted on the resulting silica/polycarbonate component-gradient film. Macroscopic phase separation was not indicated. Further, a concentration of Si element gradiently decreased from a glass surface through a film surface. Therefore, a compositional ratio of the silica component to the PC component is gradient in the range of from 10/0 to 0/10, throughout the film.

The results of heat shock test of this film were shown in Table 8.

Example 3

The solutions of Table 1 were coated on a PC substrate by using a spin coater in the order of No. 5 to 1.

When one solution was coated, the coated layer was allowed to stand at room temperature for 1 minute, and the next solution was coated, in conducting the coating steps. The transparent coated PC substrate was then allowed to stand at room temperature for 1 day, and heat treated at 100° C. for 10 hours to obtain a silica/polycarbonate component-gradient film (60 μm in film thickness).

Infrared analysis was conducted on a surface of the resulting silica/polycarbonate component-gradient film. Peaks which belong to a silica component such as a peak of Si—O—Si at about 1080 cm$^{-1}$ are indicated, but there are no peaks which belong to a polycarbonate component such as a peak of carbonate group at about 1770 cm$^{-1}$.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a film surface through a PC surface, and Si element was not detected near by the PC substrate.

Figure 2:
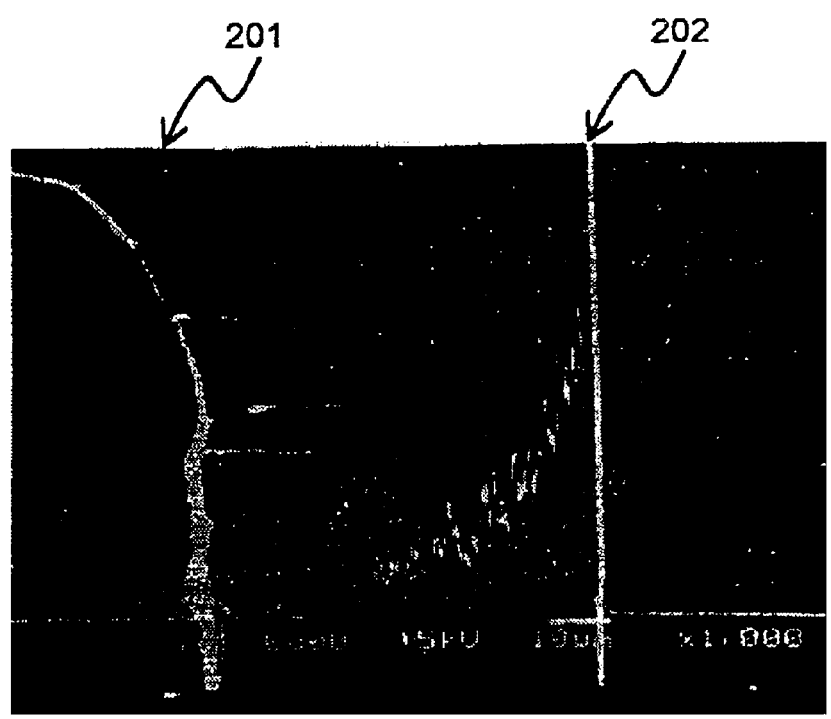
FIG. 2 is a SEM photograph which shows cross-section of silica-polycarbonate component-gradient polymer film coated on a PC substrate, with Si element concentration curve.

FIG. 2 is a SEM photograph which shows cross-section of silica-polycarbonate component-gradient film coated on a PC substrate, with Si element concentration curve. In the drawing, 201 shows a boundary part of the PC substrate and the film, and 202 shows a surface part of the film.

The Si element concentration curve of FIG. 2 indicates that a silica component is present in quantity near by the film surface and a polycarbonate (PC) component is not present, whereas, a silica component is not present near by the PC substrate and is almost a PC component. It is expected that the PC component also forms a component-gradient structure, because the silica component forms a component-gradient structure.

The results of the IR analysis and the SEM observation indicate that a compositional ratio of the silica component to the PC component is gradient in the range of from 10/0 to 0/10, throughout the film.

The results of heat shock test and chemical resistance test of this film were shown in Table 8 and 9.

Example 4

A transparent silica/polycarbonate component-gradient film was prepared according to substantially the same manner as described in Example 3, except that when one solution was coated, the coated layer was heat treated at 100° C. for 30 minutes and allowed to cool, and the next solution was coated (60 μm in film thickness)

Infrared analysis and SEM observation were conducted on the resulting silica/polycarbonate component-gradient film. Macroscopic phase separation was not indicated. Further, a concentration of Si element gradiently decreased from the film surface through the PC surface. Therefore, a compositional ratio of the silica component to the PC component is gradient in the range of from 10/0 to 0/10, throughout the film.

The results of heat shock test and chemical resistance test of this film were shown in Table 8 and 9.

Example 5

A mixed composition containing the PCS having a number average molecular weight of 4400 prepared in Preparation Example 2 and tetramethoxysilane oligomer (TMOS) commercially available from Mitsubishi Kagaku K.K. as the trade name of "MKC SILICATE MS-56", in the ratio by weight shown in Table 2 was hydrolyzed in THF by using 1N aqueous hydrochloride at room temperature to obtain solutions No. 1 to 5.

TABLE 2

Amounts of Components Employed for Preparing Wet Gel

| No. | PCS/TMOS (ratio) | PCS (g) | TMOS (g) | THF (ml) | 1N-HCl (mg) |
|---|---|---|---|---|---|
| 1 | 0/100 | 0 | 2.0 | 10 | 720 |
| 2 | 25/75 | 0.5 | 1.5 | 13 | 560 |
| 3 | 50/50 | 1.0 | 1.0 | 15 | 390 |
| 4 | 75/25 | 1.5 | 0.5 | 18 | 220 |
| 5 | 100/0 | 2.0 | 0 | 20 | 50 |

The solutions of Table 2 were coated on a glass substrate by using a spin coater in the order of No. 1 to 5, and a 10% dichloromethane solution of a polycarbonate resin having a number average molecular weight of 36000, commercially available from Mitsubishi Engineering Plastics K.K. as the trade name of "IUPILON", was then spin coated thereon in the same manner.

When one solution was coated, the coated layer was allowed to stand at room temperature for 1 minute, and the next solution was coated, in conducting the coating steps. The transparent coated glass substrate was then allowed to stand at room temperature for 1 day, and heat treated at 100° C. for 10 hours to obtain a silica/polycarbonate component-gradient film (70 μm in film thickness).

Infrared analysis and SEM observation were conducted on the resulting silica/polycarbonate component-gradient film. Macroscopic phase separation was not indicated. Further, intensity of Si element near by the glass surface was equal to that of glass, and Si element is not present near by the film surface. Therefore, a compositional ratio of the silica component to the PC component is gradient in the range of from 10/0 to 0/10, throughout the film.

The results of heat shock test of this film were shown in Table 8.

Example 6

A transparent silica/polycarbonate component-gradient film was prepared according to substantially the same manner as described in Example 5, except that when one solution was coated, the coated layer was heat treated at 150° C. for 30 minutes and allowed to cool, and the next solution was coated (50 μm in film thickness).

Infrared analysis and SEM observation were conducted on the resulting silica/polycarbonate component-gradient film. Macroscopic phase separation was not indicated. Further, a concentration of Si element gradiently decreased from the glass surface through the film surface. Therefore, a compositional ratio of the silica component to the PC component is gradient in the range of from 10/0 to 0/10, throughout the film.

The results of heat shock test of this film were shown in Table 8.

Example 7

The solutions of Table 2 were coated on a PC substrate by using a spin coater in the order of No. 5 to 1.

When one solution was coated, the coated layer was allowed to stand at room temperature for 1 minute, and the next solution was coated, in conducting the coating steps. The transparent coated PC substrate was then allowed to stand at room temperature for 1 day, and heat treated at 100° C. for 10 hours to obtain a silica/polycarbonate component-gradient film (70 μm in film thickness).

Infrared analysis and SEM observation were conducted on the resulting silica/polycarbonate component-gradient film. Macroscopic phase separation was not indicated. Further, a concentration of Si element gradiently decreased from the film surface through the PC surface. Therefore, a compositional ratio of the silica component to the PC component is gradient in the range of from 10/0 to 0/10, throughout the film.

The results of heat shock test and chemical resistance test of this film were shown in Table 8 and 9.

Example 8

A transparent silica/polycarbonate component-gradient film was prepared according to substantially the same manner as described in Example 7, except that when one solution was coated, the coated layer was heat treated at 100° C. for 30 minutes and allowed to cool, and the next solution was coated (60 μm in film thickness)

Infrared analysis and SEM observation were conducted on the resulting silica/polycarbonate component-gradient film. Macroscopic phase separation was not indicated. Further, a concentration of Si element gradiently decreased from the film surface through the PC surface. Therefore, a compositional ratio of the silica component to the PC component is gradient in the range of from 10/0 to 0/10, throughout the film.

The results of heat shock test and chemical resistance test of this film were shown in Table 8 and 9.

Example 9

A mixed composition containing the PPS having a number average molecular weight of 4300 prepared in Preparation Example 3 and tetraethoxysilane (TEOS) in the ratio weight shown in Table 3, was hydrolyzed in THF by using 1N aqueous hydrochloride at 50° C. to obtain solutions No. 1 to 5.

TABLE 3

Amounts of Components Employed for Preparing Wet Gel

| No. | PPS/TEOS (ratio) | PPS (g) | TEOS (g) | THF (ml) | 1N-HCl (mg) |
|---|---|---|---|---|---|
| 1 | 0/100 | 0 | 2.0 | 20 | 700 |
| 2 | 25/75 | 0.5 | 1.5 | 30 | 540 |
| 3 | 50/50 | 1.0 | 1.0 | 30 | 390 |
| 4 | 75/25 | 1.5 | 0.5 | 40 | 240 |
| 5 | 100/0 | 2.0 | 0 | 40 | 90 |

The solutions of Table 3 were coated on a glass substrate by using a spin coater in the order of No. 1 to 5, and a 10% chloroform solution of a polyphenylene ether resin having a number average molecular weight of 24000, commercially available from Nippon GE Plastics K.K. as the trade name of "N-50-3181", was then spin coated thereon in the same manner.

When one solution was coated, the coated layer was allowed to stand at room temperature for 10 minutes, and the next solution was coated, in conducting the coating steps. The transparent coated glass substrate was then allowed to stand at room temperature for 1 day, and heat treated at 100° C. for 10 hours to obtain a silica/polyphenylene ether component-gradient film (40 μm in film thickness).

Infrared analysis was conducted on a surface of the resulting silica/polyphenylene ether component-gradient film. Peaks which belong to a C—H bond or an aromatic ring of polyphenylene ether such as peaks at about 1470 $cm^{-1}$, 2920 $cm^{-1}$, and 1600 $cm^{-1}$ are indicated, but there are no peaks which belong to a silica component.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a glass surface through a film surface, and Si element was not detected on the film surface.

The results of the IR analysis and the Si elemental analysis by using SEM indicate that a silica component is present in quantity near by the glass surface and a polyphenylene ether component is not present, whereas, a silica component is not present near by the film surface and is almost a polyphenylene ether component. Therefore, a compositional ratio of the silica component to the polyphenylene ether component is gradient in the range of from 10/0 to 0/10, throughout the film.

Example 10

A mixed composition containing the PSS having a number average molecular weight of 6000 prepared in Preparation Example 4 and tetramethoxysilane (TMOS) in the ratio by weight shown in Table 4, was hydrolyzed in THF by using 1 N aqueous hydrochloride at room temperature to obtain solutions No. 1 to 5.

TABLE 4

Amounts of Components Employed for Preparing Wet Gel

| No. | PSS/TMOS (ratio) | PSS (g) | TMOS (g) | THF (ml) | 1N-HCl (mg) |
|---|---|---|---|---|---|
| 1 | 0/100 | 0 | 2.0 | 10 | 720 |
| 2 | 25/75 | 0.5 | 1.5 | 15 | 560 |
| 3 | 50/50 | 1.0 | 1.0 | 15 | 390 |
| 4 | 75/25 | 1.5 | 0.5 | 20 | 230 |
| 5 | 100/0 | 2.0 | 0 | 20 | 60 |

The solutions of Table 4 were coated on a glass substrate by using a spin coater in the order of No. 1 to 5, and a 10% chloroform solution of a polysulfone resin having a number average molecular weight of 22000, commercially available from Aldrich Chemical Company, Inc., was then spin coated thereon in the same manner.

When one solution was coated, the coated layer was allowed to stand at room temperature for 1 minute, and the next solution was coated, in conducting the coating steps. The transparent coated glass substrate was then allowed to stand at room temperature for 1 day, and heat treated at 100° C. for 10 hours to obtain a silica/polysulfone component-gradient film (40 μm in film thickness) Infrared analysis was conducted on a surface of the resulting silica/polysulfone component-gradient film. Peaks which belong to a polysulfone component such as peaks of a sulfone group at about 1150 cm$^{-1}$ and 1330 cm$^{-1}$ are indicated, but there are no peaks which belong to a silica component.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a glass surface through a film surface, and Si element was not detected on the film surface.

The results of the IR analysis and the Si elemental analysis by using SEM indicate that a silica component is present in quantity near by the glass surface and a polysulfone component is not present, whereas, a silica component is not present near by the film surface and is almost a polysulfone component. Therefore, a compositional ratio of the silica component to the polysulfone component is gradient in the range of from 10/0 to 0/10, throughout the film.

Example 11

A mixed composition containing the PAS having a number average molecular weight of 6700 prepared in Preparation Example 5 and tetraethoxysilane (TEOS) in the ratio by weight shown in Table 5, was hydrolyzed in N,N-dimethylformamide (DMF) by using 1N aqueous hydrochloride at 50° C. to obtain solutions No. 1 to 5.

TABLE 5

Amounts of Components Employed for Preparing Wet Gel

| No. | PAS/TEOS (ratio) | PAS (g) | TEOS (g) | DMF (ml) | 1N-HCl (mg) |
|---|---|---|---|---|---|
| 1 | 0/100 | 0 | 2.0 | 10 | 700 |
| 2 | 25/75 | 0.5 | 1.5 | 15 | 530 |
| 3 | 50/50 | 1.0 | 1.0 | 15 | 370 |

TABLE 5-continued

Amounts of Components Employed for Preparing Wet Gel

| No. | PAS/TEOS (ratio) | PAS (g) | TEOS (g) | DMF (ml) | 1N-HCl (mg) |
|---|---|---|---|---|---|
| 4 | 75/25 | 1.5 | 0.5 | 20 | 210 |
| 5 | 100/0 | 2.0 | 0 | 20 | 50 |

The solutions of Table 5 were coated on a glass substrate by using a spin coater in the order of No. 1 to 5, and a 10% dichloromethane solution of a polyarylate resin commercially available from Unitika Ltd. as the trade name of "U-POLYMER", was then spin coated thereon in the same manner.

When one solution was coated, the coated layer was allowed to stand at 50° C. for 30 minutes, and the next solution was coated, in conducting the coating steps. The transparent coated glass substrate was then allowed to stand at 50° C. for 3 days, and heat treated at 120° C. for 10 hours to obtain a silica/polyarylate component-gradient film (50 μm in film thickness).

Infrared analysis was conducted on a surface of the resulting silica/polyarylate component-gradient film. Peaks which belong to a polyarylate component such as a large peak of an ester group at about 1740 cm$^{-1}$ are indicated, but there are no peaks which belong to a silica component.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a glass surface through a film surface, and Si element was not detected on the film surface.

The results of the IR analysis and the Si elemental analysis by using SEM indicate that a silica component is present in quantity near by the glass surface and a polyarylate component is not present, whereas, a silica component is not present near by the film surface and is almost a polyarylate component. Therefore, a compositional ratio of the silica component and the polyarylate component is gradient in the range of from 10/0 to 0/10, throughout the film.

Example 12

A mixed composition containing the HPBS having a number average molecular weight of 3500 prepared in Preparation Example 6 and tetraethoxysilane (TEOS) in the ratio by weight shown in Table 6, was hydrolyzed in THF by using 1N aqueous hydrochloride at 50° C. to obtain solutions No. 1 to 5.

TABLE 6

Amounts of Components Employed for Preparing Wet Gel

| No. | HPBS/TEOS (ratio) | HPBS (g) | TEOS (g) | THF (ml) | 1N-HCl (mg) |
|---|---|---|---|---|---|
| 1 | 0/100 | 0 | 2.0 | 10 | 700 |
| 2 | 25/75 | 0.5 | 1.5 | 15 | 560 |
| 3 | 50/50 | 1.0 | 1.0 | 15 | 410 |
| 4 | 75/25 | 1.5 | 0.5 | 20 | 270 |
| 5 | 100/0 | 2.0 | 0 | 20 | 130 |

The solutions of Table 6 were coated on a glass substrate by using a spin coater in the order of No. 1 to 5. When one solution was coated, the coated layer was allowed to stand at room temperature for 30 minutes at room temperature, and the next solution was coated, in conducting the coating steps. The transparent coated glass substrate was then allowed to dry at room temperature for 1 week to obtain a silica/polybutadiene component-gradient film (40 μm in film thickness).

Infrared analysis was conducted on a surface of the resulting silica/polybutadiene component-gradient film. Peaks which belong to a polybutadiene component such as peaks of a C—H bond at about 1470 cm$^{-1}$ and 2920 cm$^{-1}$ are indicated, but there are no peaks which belong to a silica component.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a glass surface through a film surface, and Si element was not detected on the film surface.

The results of the IR analysis and the Si elemental analysis by using SEM indicate that a silica component is present in quantity near by the glass surface and a polyarylate component is not present, whereas, a silica component is not present near by the film surface and is almost a polybutadiene component. Therefore, a compositional ratio of the silica component to the polybutadiene component is gradient in the range of from 10/0 to 0/10, throughout the film.

Example 13

A mixed composition containing the PES having a number average molecular weight of 3400 prepared in Preparation Example 7 and tetramethoxysilane (TMOS) in the ratio by weight shown in Table 7, was hydrolyzed in THF by using 1N aqueous hydrochloride at room temperature to obtain solutions No. 1 to 5.

TABLE 7

Amounts of Components Employed for Preparing Wet Gel

| No. | PES/TMOS (ratio) | PES (g) | TMOS (g) | THF (ml) | 1N-HCl (mg) |
|---|---|---|---|---|---|
| 1 | 0/100 | 0 | 2.0 | 10 | 720 |
| 2 | 25/75 | 0.5 | 1.5 | 13 | 570 |
| 3 | 50/50 | 1.0 | 1.0 | 15 | 420 |
| 4 | 75/25 | 1.5 | 0.5 | 18 | 270 |
| 5 | 100/0 | 2.0 | 0 | 20 | 120 |

The solutions of Table 7 were coated on a glass substrate by using a spin coater in the order of No. 1 to 5. When one solution was coated, the coated layer was allowed to stand at room temperature for 30 minutes, and the next solution was coated, in conducting the coating steps. The transparent coated glass substrate was then allowed to dry at room temperature for 1 week to obtain a silica/polyester component-gradient film (50 μm in film thickness)

Infrared analysis was conducted on a surface of the resulting silica/polyethylene component-gradient film. Peaks which belong to a polyethylene component such as a large peak of an ester bond at about 1730 cm$^{-1}$ are indicated, but there are no peaks which belong to a silica component.

Cross section of the film was observed by using a scanning electron microscope (SEM). Macroscopic phase separation was not indicated, and good fine structure was observed. Further, an elemental analysis of Si in the perpendicular direction to a surface of the film, was conducted. A concentration of Si element gradiently decreased from a glass surface through a film surface, and Si element was not detected on the film surface.

The results of the IR analysis and the Si elemental analysis by using SEM indicate that a silica component is present in quantity near by the glass surface and a polyester component is not present, whereas, a silica component is not present near by the film surface and is almost a polyethylene component. Therefore, a compositional ratio of the silica component and the polyethylene component is gradient in the range of from 10/0 to 0/10, throughout the film.

Comparative Example 1

2.0 g of a polycarbonate resin having a number average molecular weight of 36000, commercially available from Mitsubishi Engineering Plastics K.K. as the trade name of "IUPILON", was dissolved into 20 mL of dichloromethane. The resulting solution was coated on a glass substrate according to the cast method to obtain a PC film (70 μm in film thickness)

Figure 3:
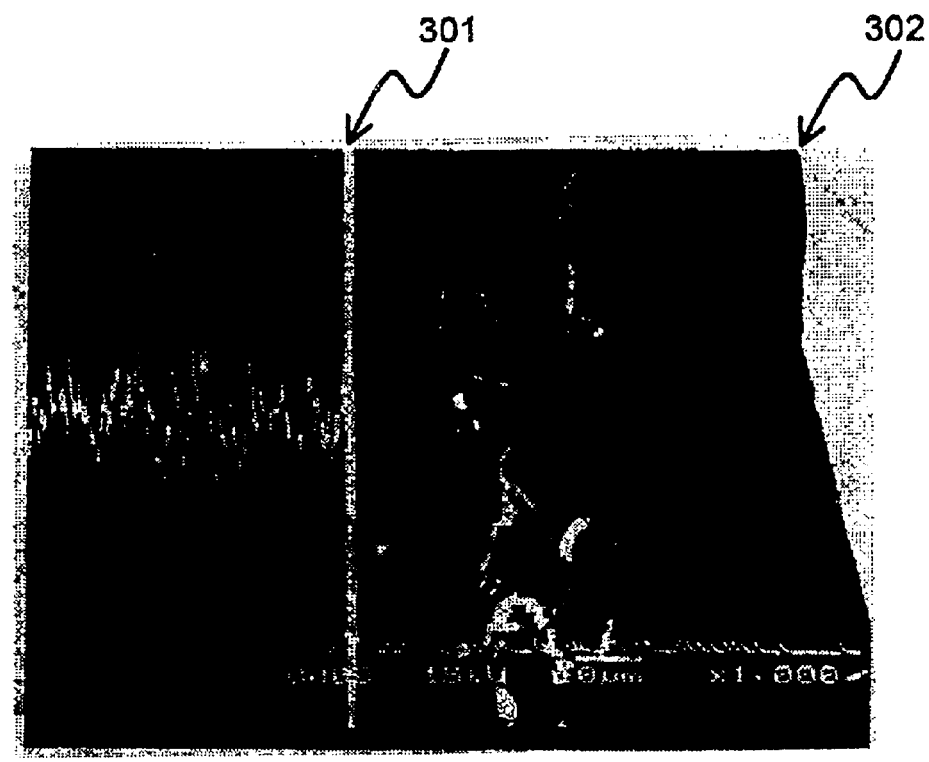
FIG. 3 is a SEM photograph which shows cross-section of PC film coated on a glass substrate, with Si element concentration curve.

SEM observation was conducted on the resulting polycarbonate film. The results indicate that distribution of Si element greatly varies between the glass and the PC. FIG. 3 is a SEM photograph which shows cross-section of the PC film coated on the glass substrate, with Si element concentration curve. In the drawing, 301 show a boundary part of the substrate and the film, and 302 shows a surface part of the film.

The results of heat shock test of this film were shown in Table 8.

Comparative Example 2

20 g of TEOS was dissolved into 20 mL of ethanol. 7.0 g of 1N aqueous hydrochloride was added to the solution, and hydrolysis was conducted. The solution was coated on a PC substrate by using the cast method to obtain a silica film (60 μm in film thickness).

Figure 4:
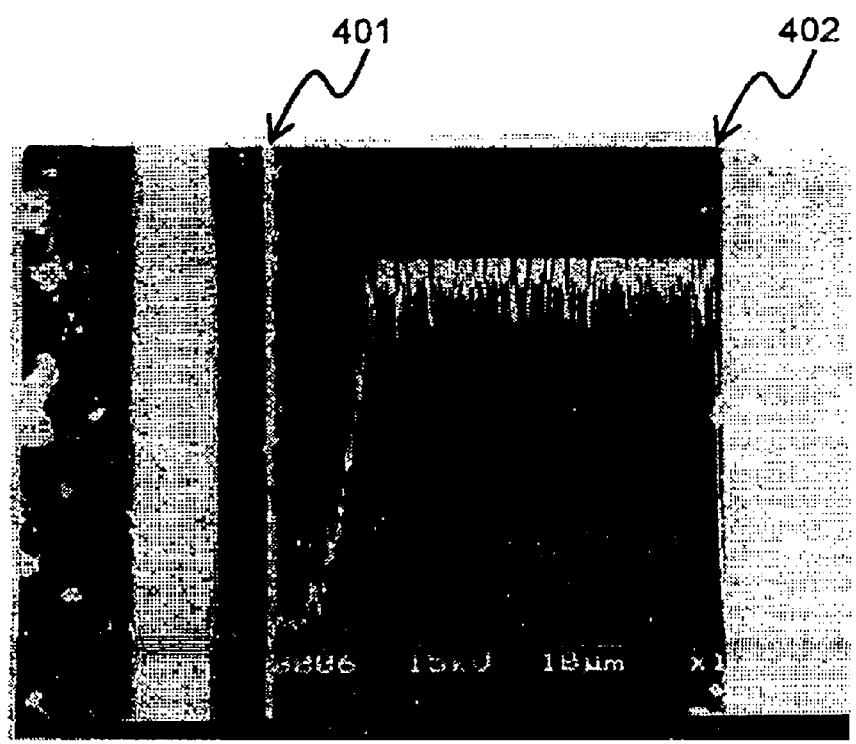
FIG. 4 is a SEM photograph which shows cross-section of silica film coated on a PC substrate, with Si element concentration curve.

SEM observation was conducted on the resulting silica film. The results indicate that distribution of Si element greatly varies between the PC and the silica. FIG. 4 is a SEM photograph which shows cross-section of the silica film coated on the PC substrate, with Si element concentration curve. In the drawing, 401 show a boundary part of the substrate and the film, and 402 shows a surface part of the film.

The results of heat shock test and chemical resistance test of this film were shown in Table 8 and 9.

Comparative Example 3

2.0 g of a polyphenylene ether resin having a number average molecular weight of 24000, commercially available from Nippon GE Plastics K.K. as the trade name of "N-50-3181", was dissolved into 20 mL of chloroform. The resulting solution was coated on a glass substrate according to the cast method to obtain a polyphenylene ether film (60 μm in film thickness).

SEM observation was conducted on the resulting polyphenylene ether film. The results indicate that distribution of Si element greatly varies between the glass and the polyphenylene ether. The results of heat shock test of this film were shown in Table 8.

Comparative Example 4

2.0 g of a polysulfone resin having a number average molecular weight of 22000, commercially available from Aldrich Chemical Company, Inc., was dissolved into 20 mL of chloroform. The resulting solution was coated on a glass substrate according to the cast method to obtain a polysulfone film (50 µm in film thickness)

SEM observation was conducted on the resulting polysulfone film. The results indicate that distribution of Si element greatly varies between the glass and the polysulfone. The results of heat shock test of this film were shown in Table 8.

Comparative Example 5

2.0 g of a polyarylate resin, commercially available from Unitika Ltd. as the trade name of "U-POLYMER", was dissolved into 20 mL of dichloromethane. The resulting solution was coated on a glass substrate according to the cast method to obtain a polyarylate film (50 µm in film thickness).

SEM observation was conducted on the resulting polyarylate film. The results indicate that distribution of Si element greatly varies between the glass and the polyarylate. The results of heat shock test of this film were shown in Table 8.

Heat Shock Test

Heat shock test was conducted on the films prepared in Examples 1 to 11, and Comparative Examples 1 to 5. Test pieces (30×30 mm) of the films were heat treated at 170° C. or 120° C. in a drying oven for 30 minutes, and immediately they were transferred in a freezer of −20° C. and allowed to stand for 30 minutes. This cycle was repeated three times. Thereafter, the test pieces were visually observed.

In the test for the samples of Examples 1, 2, 5, 6, 9, 10, 11 and Comparative Examples 1, 3, 4, 5, heating temperature was set to 170° C. As a result, the polycarbonate film of Comparative Example 1, the polyphenylene ether film of Comparative Example 3, the polysulfone film of Comparative Example 4, and the polyarylate film of Comparative Example 5 were removed. Whereas, in the silica/polycarbonate component-gradient films of Examples 1, 2, 5, 6, the silica/polyphenylene ether component-gradient film of Example 9, the silica/polysulfone component-gradient film of Example 10, and the silica/polyarylate component-gradient film of Example 11, no change was observed.

In the test for the samples of Examples 3, 4, 7, 8, and Comparative Example 2, heating temperature was set to 12° C. As a result, cracks were formed in the silica film of Comparative Example 2, and the film was removed. Whereas, in the silica/polycarbonate component-gradient film of Examples 3, 4, 7, and 8, no change was observed.

The results indicate that the materials with compositional gradient of the present invention have good heat shock resistance.

TABLE 8

Appearance of Film after Heat Shock Test

| Test Piece | Heat Temp. | Appearance |
|---|---|---|
| C. Ex. 1 | 170° C. | Film was removed, partially curved |
| Ex. 1 | 170° C. | No change |
| Ex. 2 | 170° C. | No change |
| Ex. 5 | 170° C. | No change |
| Ex. 6 | 170° C. | No change |
| C. Ex. 2 | 120° C. | Lots of cracks are formed, film was removed |
| Ex. 3 | 120° C. | No change |
| Ex. 4 | 120° C. | No change |
| Ex. 7 | 120° C. | No change |

TABLE 8-continued

Appearance of Film after Heat Shock Test

| Test Piece | Heat Temp. | Appearance |
|---|---|---|
| Ex. 8 | 120° C. | No change |
| C. Ex. 3 | 170° C. | Film was removed |
| Ex. 9 | 170° C. | No change |
| C. Ex. 4 | 170° C. | Film was removed |
| Ex. 10 | 170° C. | No change |
| C. Ex. 5 | 170° C. | Film was removed |
| Ex. 11 | 170° C. | No change |

Chemical Resistance Test

Chemical resistance test was conducted on the films prepared in Examples 3, 4, 7, 8, and Comparative Example 2. 1 mL of an organic solvent was dropped on test pieces (30×30 mm) of the films and allowed to dry. Thereafter, the test pieces were visually observed.

A PC board employed as a comparative example, was dissolved or whitened by an organic solvent such as chloroform and acetone. The same results are shown on the silica film of Comparative Example 2, and the silica layer was removed. The reason why the same results are shown on the silica layer of Comparative Example 2, would be that the silica prepared by the sol-gel method is a porous material. Furthermore, interfacial stress would be caused in the silica layer due to shrinkage accompany with the layer formation, and fine cracks would be formed throughout the silica layer. Thereby, a solvent infiltrated through the pores, came to the PC substrate, the PC substrate was solved, or deformed, and the silica layer was broken and removed.

Whereas, no change of the appearance was observed on the films of Examples 3, 4, 7, and 8, and excellent chemical resistance was shown. The reason of the excellent chemical resistance of the Examples by comparison with Comparative Example 2 would be that the films of the Examples have component-gradient structure. That is, in Examples 3, 4, 7, and 8, a silica component decreases from a film surface toward the inside, contrary a PC component increases. Therefore, the pores present in the silica component also decreases, and the pores are interrupted by the PC component, and no pores penetrate through the film. Furthermore, a large part of the PC component in the component-gradient films of Examples 3, 4, 7, and 8 is covalently bonded to the silica component. Therefore, the PC component is hard to be deteriorated, and chemical resistance is improved by synergistic effect of the two component.

The results indicate that the materials with compositional gradient of the present invention have good chemical resistance.

TABLE 9

Film Appearance after Chemical Resistance Test

| Organic Solvent | PC board | CEx. 2 | Ex. 3 | Ex. 4 | Ex. 7 | Ex. 8 |
|---|---|---|---|---|---|---|
| methanol | ◯ | ◯ | ◯ | ◯ | ◯ | ◯ |
| ethanol | ◯ | ◯ | ◯ | ◯ | ◯ | ◯ |
| acetone | X | X | ◯ | ◯ | ◯ | ◯ |
| ethyl acetate | X | X | ◯ | ◯ | ◯ | ◯ |
| THF | X | X | ◯ | ◯ | ◯ | ◯ |

TABLE 9-continued

Film Appearance after Chemical Resistance Test

| Organic Solvent | PC board | CEx. 2 | Ex. 3 | Ex. 4 | Ex. 7 | Ex. 8 |
|---|---|---|---|---|---|---|
| dichloromethane | X | X | ○ | ○ | ○ | ○ |
| chloroform | X | X | ○ | ○ | ○ | ○ |
| benzene | X | X | ○ | ○ | ○ | ○ |
| n-hexane | ○ | ○ | ○ | ○ | ○ | ○ |
| diethyl ether | ○ | ○ | ○ | ○ | ○ | ○ |

○: No change of the appearance was observed.
X: Change of the appearance such as dissolution, swelling, clouding, discoloration, and removal, was observed.

What is claimed is:

1. Organic-inorganic hybrid polymer materials with compositional gradient composed of an organic polymer component and a metal oxide component which are covalently bonded to each other, wherein concentration of the organic polymer component, or of the metal oxide component, is increased or decreased in the direction of thickness of the material.

2. Organic-inorganic hybrid polymer materials with compositional gradient composed of an organic polymer component and a metal oxide component which are covalently bonded to each other, wherein concentration of the organic polymer component is increased or decreased in the direction of thickness of the material.

3. Organic-inorganic hybrid polymer materials with compositional gradient composed of an organic polymer component and a metal oxide component which are covalently bonded to each other, wherein concentration of the metal oxide component is increased or decreased in the direction of thickness of the material.

4. The organic-inorganic hybrid polymer materials with compositional gradient according to any one of claims 1 to 3, wherein the organic polymer has at least one functional group selected from the group composed of an alkoxymetal group, a hydroxyl group, an amino group, and a carboxyl group.

5. The organic-inorganic hybrid polymer materials with compositional gradient according to any one of claims 1 to 3, wherein the organic polymer has at least one alkoxymetal group as a functional group.

6. The organic-inorganic hybrid polymer materials with compositional gradient according to any one of claims 1 to 3, wherein the organic polymer has a number average molecular weight of from 2000 to 10000 measured by GPC.

7. The organic-inorganic hybrid polymer materials with compositional gradient according to any one of claims 1 to 3, wherein the organic polymer comprises a thermoplastic resin as a main chain.

8. The organic-inorganic hybrid polymer materials with compositional gradient according to any one of claims 1 to 3, wherein the organic polymer comprises polycarbonate or polyarylate as a main chain.

9. The organic-inorganic hybrid polymer materials with compositional gradient according to any one of claims 1 to 3, wherein the metal oxide is obtained by hydrolyzing and polycondensing a metal alkoxide compound or the low condensate thereof.

10. The organic-inorganic hybrid polymer materials with compositional gradient according to any one of claims 1 to 3, wherein a metal element of the metal oxide component is at least one selected from the group composed of Si, Ti, and Zr.

11. The organic-inorganic hybrid polymer materials with compositional gradient according to any one of claims 1 to 3, wherein a metal element of the metal oxide component is Si.

* * * * *